United States Patent [19]
Atkinson

[11] 3,845,923
[45] Nov. 5, 1974

[54] VIBRATION-ISOLATING MOUNTING FOR ENGINES

[75] Inventor: David William Atkinson, Peoria, Ill.

[73] Assignee: Caterpillar Tractor Co., Peoria, Ill.

[22] Filed: Nov. 24, 1972

[21] Appl. No.: 309,240

[52] U.S. Cl. .................................. 248/3, 115/.5 B
[51] Int. Cl. ........................ F16m 5/00, F16f 15/00
[58] Field of Search ............ 248/3, 9, 10, 8, 22, 15; 267/153; 115/.5 B

[56] References Cited
UNITED STATES PATENTS

| | | | |
|---|---|---|---|
| 1,698,453 | 1/1929 | Sardeson et al. | 248/8 |
| 1,912,269 | 5/1933 | Funk | 248/9 |
| 1,912,270 | 5/1933 | Funk | 248/9 |
| 1,995,245 | 3/1935 | Funk | 248/9 |
| 2,046,558 | 7/1936 | Hussman | 115/.5 B |
| 2,059,220 | 11/1936 | Fernstrum | 115/.5 B |
| 3,180,594 | 4/1965 | Connell | 267/153 X |

FOREIGN PATENTS OR APPLICATIONS 501,161  2/1939  Great Britain .......................... 248/8

Primary Examiner—J. Franklin Foss
Attorney, Agent, or Firm—Phillips, Moore, Weissenberger, Lempio & Strabala

[57] ABSTRACT

A vibration-isolating mounting assembly for an engine includes means to absorb torque induced vibration about its drive axis and means to absorb thrust induced vibrations along the drive axis. The mounting assembly is particularly adapted to marine engines and includes horizontally oriented resilient pads operatively positioned to isolate a pair of support rails disposed at each side of an engine from a stationary support bed or member. A pair of vertically disposed resilient pads are operatively positioned between a thrust restraining member secured to the bed and the support rails to absorb thrust vibrations.

5 Claims, 2 Drawing Figures

PATENTED NOV 5 1974 3,845,923
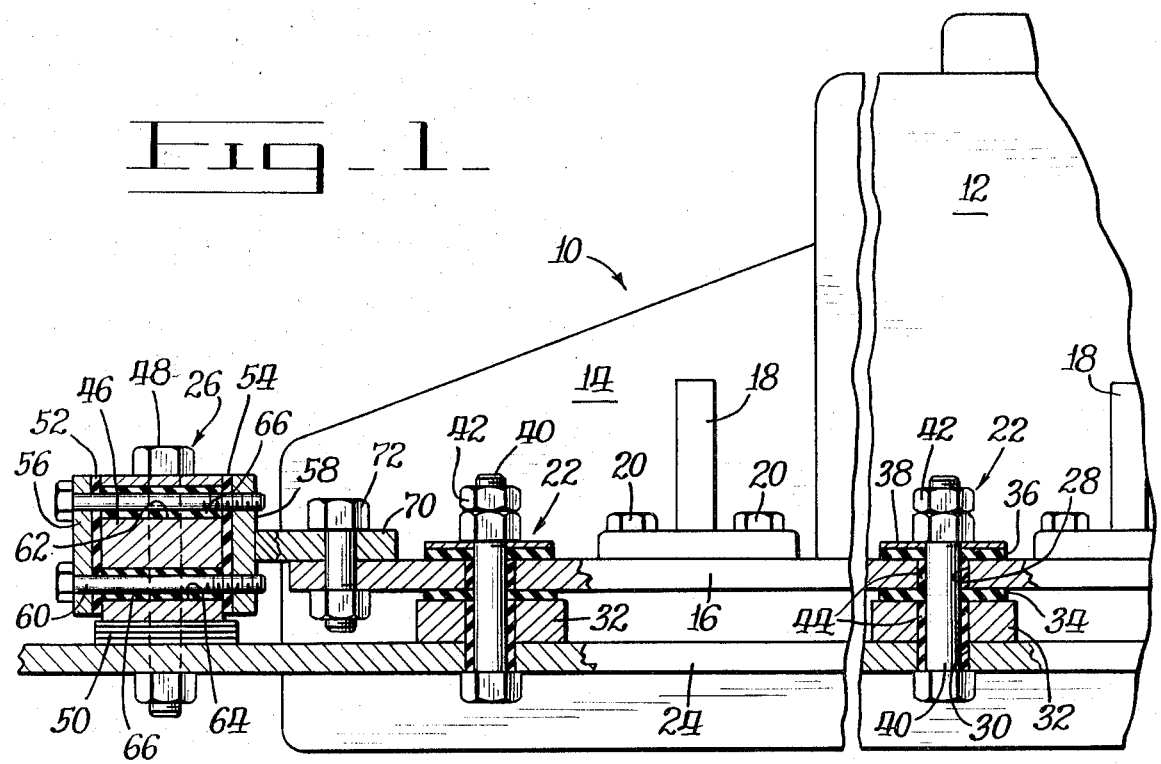
Fig_1_
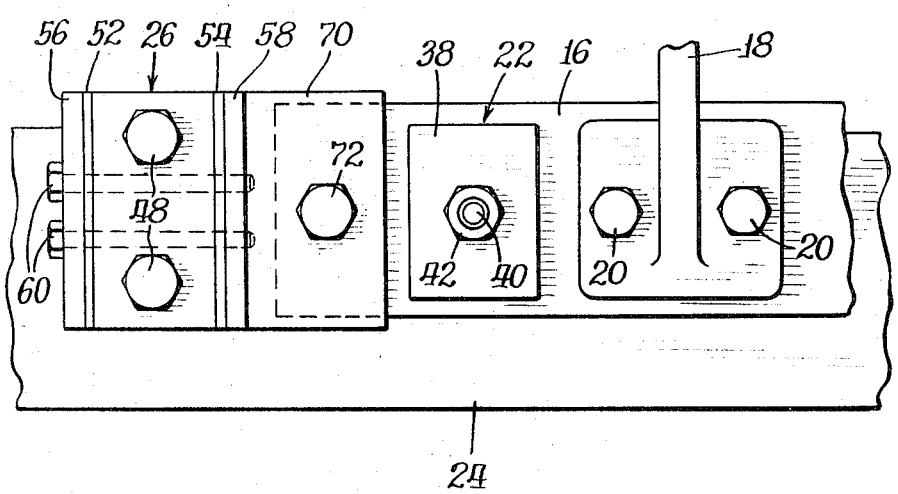
Fig_2_

VIBRATION-ISOLATING MOUNTING FOR ENGINES

BACKGROUND OF THE INVENTION

The present invention is directed to vibration-isolating mounts and pertains more particularly to vibration-isolating mounts for marine engines and the like.

Power plants are commonly mounted on resilient mounts to reduce the transmission of vibration to the supporting structure. In the typical configuration the mounts comprise resilient pads supporting the engine in the vertical direction. Such arrangements are satisfactory in the typical power plant installation since the typical load on the engine is that of torque transmitted to the supporting structure in the vertical direction. Such pads, thus, carry the weight of the engine as well as the torque load thereof.

This type isolating means does not prove to be satisfactory in marine and similar installations wherein a thrust load is imposed on the engine. Even where resilient grommets or sleeves have been provided around mounting bolts to prevent direct contact thereof with frame or engine, such mounts have been unsatisfactory. The high thrust loads from the propellor shaft cause rapid deterioration of such grommets resulting in early failure thereof. This permits direct metal-to-metal contact and direct transmission of vibration and sound from the engine support structure to the hull of the ship. Such sound and vibrations travel throughout the ship's hull and can become magnified. Such vibration can have a detrimental effect on ships' structures and equipment as well as on passengers and crew. Moreover, vibrations within the audible (i.e. sound or noise) range can be very disturbing to passengers.

An example of the prior art construction is illustrated in U.S. Pat. No. 2,631,810 issued Mar. 17, 1953 to Zuhn. This construction, however, is somewhat complicated and expensive to manufacture, and does not provide sufficient thrust absorbing qualities.

SUMMARY OF THE INVENTION

It is the primary object of the present invention to overcome the above problems of the prior art.

Another object of the present invention is to provide a simple and inexpensive vibration-isolating engine mount.

A further object of the present invention is to provide a vibration-isolating mounting assembly that is effective to absorb both thrust and torque loads.

In accordance with the present invention there is provided a vibration-isolating mount that is effective to absorb both vertical loads on the engine as well as horizontal thrust loads.

BRIEF DESCRIPTION OF THE DRAWINGS

The above and other objects and advantages of the present invention will become apparent from the following description when read in conjunction with the accompanying drawings in which:

FIG. 1 is an elevational view, partially in section of an engine mounting assembly in accordance with the invention; and, FIG. 2 is a plan view of a portion of the assembly of FIG. 1;

DESCRIPTION OF THE PREFERRED EMBODIMENT

Referring now to FIG. 1 of the drawings there is illustrated a power plant or prime mover and drive arrangement adapted for marine installations, generally indicated by a numeral 10, and comprising an internal combustion engine 12 and a gear drive or transmission assembly 14 operatively connected in drive relation thereto. The engine and transmission are connected in the usual manner to a drive shaft for driving propellors to drive or propel a vessel.

The power plant arrangements comprising the engine and transmission are mounted directly to a pair of generally parallel disposed rails 16 by means of a plurality of brackets 18 with suitable means such as a plurality of bolts and cap screws 20. The rails 16 are disposed on each side of the engine and transmission assembly, and extend generally parallel to the drive axis of the engine and drive train. The rails 16 are then each secured by suitable resilient mounts, generally designated by the numeral 22, to a stationary support member 24 disposed directly beneath the rail and generally referred to as the ship's engine bed. Thrust restraining means, generally designated by the numeral 26, operatively connects the rails 16 at one end to the engine bed or stationary support means 24.

The resilient mounts 22 each comprise cylindrical bores 28 and 30 in coaxial alignment and formed respectively in the rail 16 and stationary support member 24. And further includes a spacer 32 resting on support member 24 and a pair of resilient pads 34,36 disposed on either side of rail 16 and respectively confined between spacer 32 and a washer 38. A bolt 40 having a lock nut arrangement 42, so as to maintain a preadjusted tension, extends through the bores 28 and 30 and through the above-mentioned spacer pads and washers to complete the assembly and provide for appropriate adjustment. The pads 34 and 36 are constructed of a suitable sound-proofing or absorbing material, such as a rubber fabric composition, so as to have the appropriate sound and vibration-absorbing qualities as well as the ability to secure the engine and drive assembly in position. The spacers 32 are machined to the proper thickness for vertical alignment of the engine 12 and transmission 14.

These resilient mounts 22 are constructed and arranged to secure the engine and drive assembly in position and to absorb vertical components of vibration and torque imposed thereon as a result of the engine and torque feedback to the drive arrangement.

The bolt 40 is of a smaller diameter than the bores 28 and 30 so as to provide an annular space therebetween to avoid the transmission of vibration from the rail 16 through the bolt 40 and into the bed or support member 24. This annular space between bolt 40 and bores 28, 30 may be filled by suitable sleeves or grommets of suitable sound-absorbing material such as a rubber fabric material, as illustrated, and designated by the numeral 44. It is to be understood that these are purely for the purpose of spacing of the bolt away from the bores and not intended for the purpose of transmitting longitudinal forces between the rail 16 and support member 24.

Longitudinal forces transmitted to the engine drive assembly such as from the propellor shaft or the like are transmitted between support rail 16 and support or bed member 24 by the previously mentioned thrust restraining means 26. The thrust restraining means comprises a reaction block 46 secured by means of a plurality of bolts 48 directly to the ship's engine bed or support member 24 and including spacers 50 to provide proper alignment for this connecting means between the thrust restraining means and rail 16. A pair of resilient pads 52 and 54 composed of a suitable sound-absorbing material are disposed on each side of block 46 and confined between a pair of end plates 56, 58 which are secured together by suitable cap screws 60 extending through pairs of horizontal bores 62, 64 and resilient sleeve 66 extending therethrough. End plate 58 includes a bracket or flange 70 secured in a suitable manner such as by means of a bolt 72 directly to one end of rail 16.

Thus, the thrust-absorbing means or restraining means 26 is constructed with vertically oriented absorbing pads and operatively connected between the mounting rail 16 and supported member 24 to restrain axial forces on the engine drive arrangement 10 and to damp out vibrations that might otherwise be transmitted from the engine assembly to the supporting member 24.

Thus, it is seen from this arrangement that there is provided resilient mounts for operatively connecting an engine and drive assembly directly to a support structure in a manner to provide vertical support for the engine drive arrangement and to simultaneously therewith absorb or damp out vibrations that would otherwise be transmitted therebetween. In combination therewith, suitable thrust absorbing mounting means is also provided which is also arranged to simultaneously therewith absorb thrust loads imposed or transmitted between the engine and drive arrangement and a supporting structure to simultaneously abosrb vibrations that would ordinarily be transmitted therebetween.

While the present invention has been described with respect to a specific embodiment it is to be understood that numerous changes and modifications may be made therein without departing from the spirit and scope of the present invention as defined in the claims.

What is claimed is:

1. A vibration-isolating mounting assembly for a marine engine and drive gear, said assembly comprising in combination:
   an engine operatively connected in a drive arrangement to transmit and receive torque forces about its axis and thrust forces along said axis;
   a pair of support rails extending parallel to the axis of said engine, one on each side thereof secured directly to said engine, said rails having forward and rearward ends corresponding in proximity to the forward and rearward ends of said engine;
   a stationary support member extending beneath each of said support rails;
   means including resilient pads, a plurality of aligned holes, each lined with a resilient sleeve in each of said rail and support members, and a bolt extending through each of said aligned holes, securing each of said rails to said support members to support said engine; and
   thrust restraining means including resilient means secured between each said rail and said support member at the rearward end of said rail substantially in the plane of and substantially in alignment therewith and operative to restrain said rail against horizontal forces acting on said engine, said thrust restraining means comprising a reaction block secured to and extending upward from said support member, a pair of face plates having plane surfaces disposed on opposite sides of said reaction block and at right angles to the axis of said engine, a resilient sound absorbing pad disposed between each of said face plates and said reaction block, a flange securing one of said face plates to said rail, and
   means for securing said pair of face plates together and for forcing said resilient pads into contact with said reaction block.

2. A vibration-isolating mounting assembly for a marine engine and drive gear, said assembly comprising in combination:
   an engine operatively connected in a drive arrangement to transmit and receive torque forces about its axis and thrust forces along said axis;
   a pair of support rails extending parallel to the axis of said engine at each side thereof secured directly to said engine, said rails having forward and rearward ends corresponding in proximity to the forward and rearward ends of said engine;
   a stationary support member extending beneath each of said support rails;
   means including resilient pads, a plurality of aligned holes in each of said rail and support members, a bolt extending through each of said aligned holes and said pads and said bolts being of a dimension to avoid contact with said rails and said support members within said holes securing each of said rails to said support members to support said engine; and
   thrust restraining means including a reaction block secured to and extending upward from said support member;
   a pair of face plates disposed on opposite sides of said reaction block;
   a resilient sound absorbing pad disposed between each of said face plates and said reaction block;
   a flange securing one of said face plates to said rail; and
   means for securing said pair of face plates together and for forcing said resilient pads into contact with said reaction block.

3. The support assembly of claim 1 wherein said means for securing said face plates together comprises a plurality of bolts extending through cylindrical bores formed in said reaction block between said plates.

4. The support assembly of claim 2 wherein said face plates define plane surfaces engaging like surfaces defined by said pads; and,
   said plane surfaces are disposed at right angles to the axis of said engine.

5. The support assembly of claim 2 wherein said thrust restraining means is disposed substantially in the plane of said rail and in longitudinal alignment therewith.

* * * * *